(12) United States Patent
Woodward

(10) Patent No.: US 7,007,297 B1
(45) Date of Patent: Feb. 28, 2006

(54) FIBER-OPTIC ACCESS NETWORK UTILIZING CATV TECHNOLOGY IN AN EFFICIENT MANNER

(75) Inventor: Sheryl Leigh Woodward, Holmdel, NJ (US)

(73) Assignee: AT&T Corp., New York, NY (US)

( * ) Notice: Subject to any disclaimer, the term of this patent is extended or adjusted under 35 U.S.C. 154(b) by 402 days.

(21) Appl. No.: 09/703,857

(22) Filed: Nov. 1, 2000

(51) Int. Cl.
*H04N 7/173* (2006.01)
*H04N 7/18* (2006.01)

(52) U.S. Cl. .................... 725/129; 715/78; 715/83; 715/85

(58) Field of Classification Search ............... 725/78, 725/83, 85, 129, 114, 138, 144; 375/261, 375/269, 298; 398/176; 359/237
See application file for complete search history.

(56) References Cited

U.S. PATENT DOCUMENTS 5,699,105 A * 12/1997 Chen et al. ............. 725/120
6,011,950 A * 1/2000 Young ....................... 725/67
6,538,781 B1 * 3/2003 Beierle et al. .............. 398/79
6,577,414 B1 * 6/2003 Feldman et al. ........... 725/129

OTHER PUBLICATIONS

Woodward et al., "*A Passive-Optical Network Employing Upconverted 16-CAP Signals*", IEEE Photonics Tech. Letters, vol. 8, No. 9, Sep. 1996, pps. 1249-1251.
Wilson et al., "*Reduction of Optical-Beat Interference (OBI) In Cable-Modem/FTTH Systems Using Burst-Mode Lasers*", ECOC '98, Sep. 1998, pps. 369-370.

* cited by examiner

*Primary Examiner*—Vivek Srivastava
*Assistant Examiner*—Joseph G. Ustaris

(57) ABSTRACT

A system is provided for combining conventional HFC plants with fiber-optic access systems (e.g., fiber-to-the-home or fiber-to-the-curb) that share a head-end and other equipment. A robust modulation format, such as QPSK, having a sufficient SNR to transmit information (e.g., data, digital audio and digital video) downstream to users' premises via a fiber-optic access system is used. Also, a method and apparatus is provided for converting a first modulation format for information received via a fiber-optic access system to a modulation format compatible with customer premises equipment.

1 Claim, 3 Drawing Sheets

RF spectrum for HFC plant carrying digital information on QAM subcarriers spaced at 6 MHz RF spectrum for FTTH plant carrying digital information on QPSK subcarriers spaced at 24 MHz

FIBER-OPTIC ACCESS NETWORK UTILIZING CATV TECHNOLOGY IN AN EFFICIENT MANNER

TECHNICAL FIELD OF THE INVENTION

The present invention relates generally to utilizing a robust modulation format for transmitting information on a cable television system including a fiber-optic access system.

BACKGROUND OF THE INVENTION

1. Background

Historically, cable television (CATV) infrastructure has been optimized for providing broadcast services, such as broadcast television. Conventional CATV infrastructure includes hybrid-fiber coaxial (HFC) architecture that provides low cost distribution of broadcast services.

CATV providers, no longer offering only broadcast television, now offer a wide range of services, with new broadband services constantly being introduced. These new services demand more Mbps/user, and eventually the demand may exceed network capacity.

As the price of optical components drops and network demand increases, HFC architectures may cease to be the most efficient infrastructure for delivering broadband services to the home. It is well known that fiber-optic access systems (i.e., systems that bring fiber closer to the home than conventional HFC architecture, such as fiber-to-the-home (FTTH), fiber-to-the-curb (FTTC) and the like) can have far greater capacity than HFC architectures. However, to displace conventional HFC systems, a new architecture including fiber-optic access systems is needed for delivering broadband services.

Migration to an architecture including a fiber-optic access system cannot be accomplished overnight. Thus, for a prolonged period, CATV infrastructure will include both fiber-optic access systems and HFC architecture. Therefore, there is a need for a CATV infrastructure employing fiber-optic access systems and HFC distribution plants that share a primary hub and other equipment.

Additionally, conventional HFC architectures generally utilize a modulation format having a high signal-to-noise ratio (SNR) that is required for broadcast transmissions. For example, traditional, analog, broadcast-television signals employ amplitude modulation vestigial sideband (AM-VSB), which requires a very high carrier-to-noise ratio (CNR), and traditional HFC architectures have been designed to support this.

Also, because coaxial cable has limited bandwidth, bandwidth efficient modulation formats are used. For example, downstream digital signals (e.g., digital video or data) typically employ quadrature-amplitude-modulation (QAM), such as 64-QAM or 256-QAM, with either 6 or 8 bits per symbol. Channels are generally separated by 6 MHz, and consequently, a 5 Msymbol/sec data rate is employed. A simple calculation shows that if the full 55 MHz–860 MHz band is used to carry digital signals, the coaxial cable can carry over 5 Gbps (i.e., 134 channels×5 Msamples/channel×8 bits/sample for 256-QAM). This is shared by all the homes on the coaxial bus, which can vary between 50 and 2000 homes.

It is desirable to use fiber-optic access systems, such as FTTH, in distribution architectures, because the bandwidth of fiber-optic links is much greater than coaxial cable. However, it can be expensive to provide fiber-optic links capable of maintaining the necessary SNR for conventional CATV modulation formats, such as QAM and AM-VSB. A low-noise optical link employing a spectrally efficient modulation format generally requires that the link be operated with a high-power receiver. Also, higher SNR requirements imply a lower tolerance for impairments in optical links caused by optical fiber non-linearity. These two conditions (i.e., more power at the receiver and low tolerance for optical fiber non-linearity) reduce the maximum span length between optical amplifiers, which increases system costs. Therefore, a need exists to provide a distribution system employing fiber-optic access systems using a robust modulation format for downstream transmission of information and having a relatively inexpensive cost of implementation. Additionally, conventional customer premises equipment (CPE), such as a television set, set-top box, cable modem, digital/analogue telephone, set-top Internet access device, personal digital assistant and any device configured to receive signals via a CATV infrastructure maybe configured to receive information in conventional CATV modulation formats (e.g., AM-VSB and QAM). Therefore, a need exists to provide a distribution system employing fiber-optic access systems that supports conventional CATV modulation formats.

2. Prior Art

Woodward et al. discusses in a 1996 IEEE publication entitled "A Passive-Optical Network Employing Upconverted 16-CAP Signals" that an FTTC PON employing a 16-CAP modulation format transmits information downstream to optical network units (ONUs) in close proximity to users' homes. However, Woodward et al. does not disclose converting signals in a 16-CAP format to a modulation format compatible with CPE.

Wilson et al. discusses in a publication entitled "Reduction Of Optical-Beat Interference (OBI) in Cable-Modem/FTTH Systems Using Burst-Mode Lasers" that a FTTH architecture transmits information downstream using a 64-QAM modulation format. However, transmitting information downstream over a fiber-optic link using 64-QAM generally requires high power at the receiver and a low tolerance for impairments in optical links. These two conditions (i.e., more power at the receiver and low tolerance for fiber non-linearity) reduce the maximum span length between optical amplifiers, which increases system costs.

SUMMARY OF THE INVENTION

It is an aspect of the present invention to provide a distribution plant including a fiber-optic access system. It is a further aspect of the present invention to transmit information downstream on the distribution plant using a robust modulation format. It is an even further aspect of the present invention to provide a distribution system capable of providing information in a modulation format compatible with conventional CPE.

In accordance with the aspects of the present invention, a distribution plant employing a FIBER-OPTIC ACCESS SYSTEM, such as FTTH, maybe provided. The FTTH plant shares a head-end with a conventional HFC plant. Additionally, quadrature phase shift key (QPSK) modulation format is used to transmit information downstream to users' premises. Also, signals transmitted on the distribution plant employing the fiber-optic access system are transmitted at the same bit rate per RF channel as media signals transmitted on the hybrid-fiber coaxial distribution plant. Therefore, equipment developed for HFC systems may easily be converted to a FTTH or other fiber-optic access system application. Additionally, as discussed above, conventionally QAM is used to transmit digital information downstream in an HFC plant. However, QAM requires a high SNR for transmission over fiber-optic links. Therefore, it is advantageous to use QPSK to transmit information downstream on the FTTH plant, because QPSK requires a lower SNR than QAM.

Also, in accordance with the aspects of the present invention, a method and apparatus is provided for converting information received via the FTTH plant using a first robust modulation format, such as QPSK, to a modulation format compatible with CPE, such as a QAM format.

Also in accordance with the aspects of the present invention, a user interface apparatus is provided that includes a first adaptor circuit coupled to an optical receiver and operable to select at least one channel from a plurality of channels received via the optical receiver. The first adaptor circuit is connected to in-home wiring within the user premises. In-home wiring can include conventional in-home wiring and local wireless links. Also, a second adaptor circuit is provided that is connected to the in-home wiring and operable to receive signals transmitted on the at least one channel and convert the signals to a format compatible with CPE.

Also in accordance with the aspects of the present invention, a method of converting signals received from a head-end over a distribution plant including fiber-optic links to a format compatible with customer premises equipment is provided. The method comprises steps of receiving the signals in a first format from the head-end in a downstream bandwidth; selecting a channel in the downstream bandwidth carrying some of the received signals; transmitting the signals carried in the selected channel on the selected channel to an adaptor circuit; and converting the signals received on the selected channel to the format compatible with customer premises equipment at the adaptor circuit.

Other features and advantages of the present invention will become apparent with reference to the following detailed description and figures.

BRIEF DESCRIPTION OF THE DRAWINGS

The present invention is illustrated by way of example and not limitation in the accompanying figures in which like reference numerals indicate similar elements and in which.

DETAILED DESCRIPTION OF THE INVENTION

Figure 1:
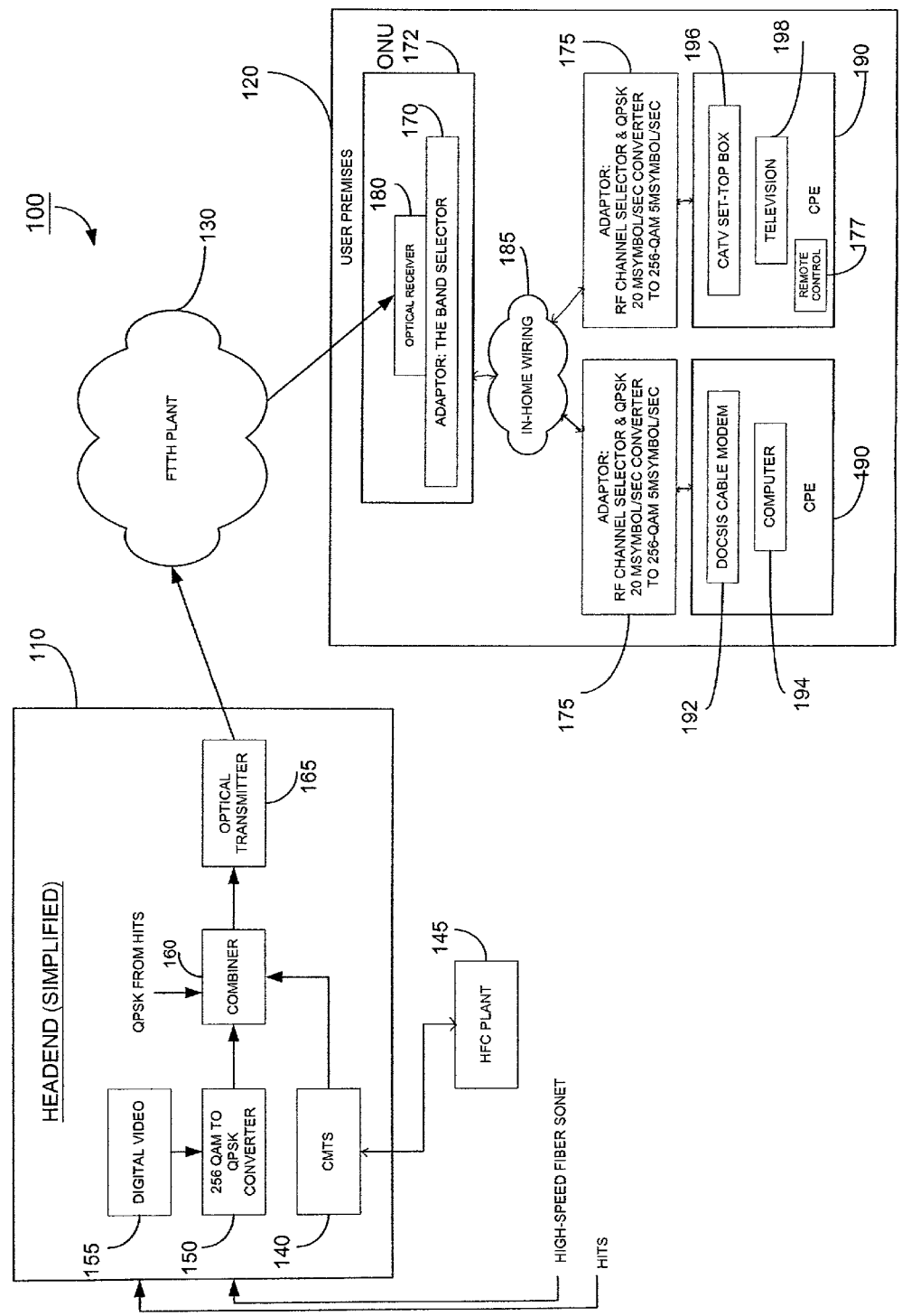
FIG. 1 is a schematic block-diagram of a system employing the various principles of a preferred embodiment of the present invention.

FIG. 1 is a schematic block-diagram of system 100 employing the principles of a preferred embodiment of the present invention. Headend (HE) 110 is connected to user premises 120 via FTTH plant 130 and is operable to provide multimedia services, such as digital/analogue video and audio, high-speed data, video telephony and the like, to user premises 120. FTTH plant 130 is shown by way of example only and the present invention is not limited to a FTTH plant. Other known fiber-optic access systems, such as FTTC and the like, may be used in lieu of FTTH plant 130. Although not shown, HE 110 can support thousands of users via multiple distribution plants, such as FTTH plant 130 and HFC plant 145.

HE 110 includes conventional cable modem termination system (CMTS) 140 connected to HFC plant 145 and FTTH plant 130. CMTS 140 controls upstream and downstream transmission between cable modems coupled to plants 130 and 145 and transmission on wide area networks (WANs) connected, for example, to the Internet.

HE 110 includes converter 150, combiner 160 and optical transmitter 165 for converting digital information signals to QPSK format and transmitting the signals to user premises 120 via FTTH 130 in QPSK format. For example, HE 110 may receive digital video signals 155 in a variety of formats from multiple sources, such as a head-end in the sky (HITS) and a high-speed fiber link.

HE 110 may receive digital video signals 155 signals from the high-speed fiber link as time-division multiplexed signals. The high-speed fiber link may utilize any known standard. Frequently, the SONET (synchronous optical network) standard is used by the fiber link. This standard uses on/off keying, and the payload is placed within SONET frames following the SONET standard. Other standards, which can use ON/OFF keying or RF subcarrier transmission, may also be employed by the fiber link for transmitting digital video signals 155 to HE 110. When RF subcarrier transmission is used to transmit digital video signals 155 to HE 110, multiple video programs are modulated by RF carriers. These RF channels typically have a symbol rate of 5 Msymbol/sec, and the typical modulation format is either 256-QAM (so the RF channel has a bit rate of 40 Mbits/sec) or 64-QAM (so the RF channel has a bit rate of 30 Mbits/sec).

For transmission of signals on HFC plant 145, signals received from the SONET link may be converted to QAM and subcarrier-multiplexed for transmission on HFC plant 145.

64-QAM and 256-QAM are not optimal modulation formats for fiber-optic systems, because these modulation formats require a high SNR that is costly to achieve for fiber-optic links. Therefore, within HE 110 the QAM signals may be converted to QPSK format having a 15 or 20 Msymbol/sec data rates by converter 150 (the symbol rate is chosen to maintain the same bit-rate in the QPSK channel as was used in the QAM channel). These signals are combined with QPSK signals from CMTS 140 and other multimedia signals in QPSK format, such as digital video signals from the HITS, by combiner 160. Optical transmitter 165 transmits the output of combiner 160 to multiple user premises via FTTH plant 130.

User premises 120 includes adaptor 170 for selecting a channel and adaptor 175 for converting signals received on the channel to a format usable by coupled CPE. Optical receiver 180 receives signals from HE 110 via FTTH 130. Adaptor 170, receiving signals from optical receiver 180, includes a band selector for selecting a particular channel for transmission to CPE 190 via in-home wiring 185. For example, bandwidth on FTTH systems is virtually unlimited, and a user may wish to receive signals, such as desired digital video or data, transmitted on a particular channel. The band selector can be used to select a channel or band of channels carrying the desired digital video or data. Therefore, in-home wiring 185 will not need to support the full bandwidth of the optical signal, and not all of the incoming signal will need to be converted into a CATV format (e.g., 256-QAM). Optical receiver 180 and adaptor 170 may be included in optical network unit 172 connected to or included in user premises 120.

CPE 190 (e.g., DOCSIS modem 192 connected to computer 194 or set-top box 196 connected to television 198) may use adaptor 175 to instruct adaptor 170 to select a particular channel having, for example, desired data or desired digital video. For CPE 190, such as set-top box 196, a user input device, such as remote control 177, can be used to select a particular channel. Adaptor 175 may include conventional receiver circuitry (not shown) for receiving channel selection signals from a user input device and conventional transceiver circuitry (not shown) for transmitting a signal indicative of the user-selected channel to adaptor 170.

Adaptor 170 sends signals transmitted on the user-selected channel to adaptor 175. Adaptor 175 includes a converter for converting signals from QPSK to a format (e.g., 256 QAM 5 Msymbol/sec) usable by CPE 190. For example, conventional televisions include circuitry for receiving QAM signals for display.

Bandwidth in HFC CATV systems is limited to approximately 1 GHz, but a high SNR can be maintained for QAM signals. In FTTH systems the bandwidth is virtually unlimited, but it is difficult to maintain a high SNR for QAM signals transmitted over fiber. QPSK requires a SNR comparable to OOK (i.e., On-Off Keying; a modulation format used for transmission over fiber), and is therefore a more appropriate modulation format for FTTH systems than the more bandwidth efficient 256-QAM modulation format that is commonly employed in CATV systems.

A 20 Msymbol/sec QPSK channel will have the same bit rate as a 5 Msymbol/sec 256-QAM channel. To transmit content over FTTH plant 130, 20 Msymbol QPSK channels spaced between 20 and 24 MHz can be used, rather than the 5 Msymbol/sec 256-QAM channels spaced at 6 MHz that are commonly used in HFC systems. Keeping the same bit-rate per RF channel allows a FTTH system to carry the same content broken into the same channel assignments as a HFC system. This allows equipment developed for HFC to be easily converted to a FTTH application. Adaptor 175 converts the desired channel from QPSK to 256-QAM, allowing customers to use existing CPE to receive the signals.

Figure 2A:
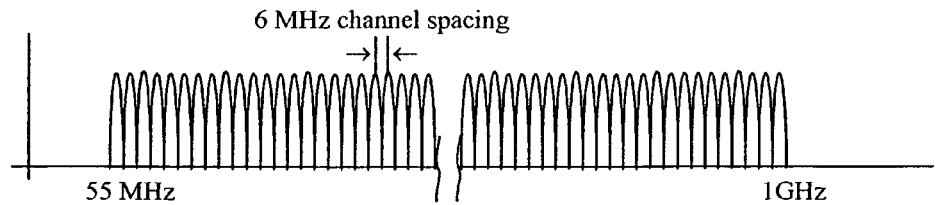
FIG. 2 illustrates spectrums at various points on the system shown in FIG. 1.
Figure 2B:
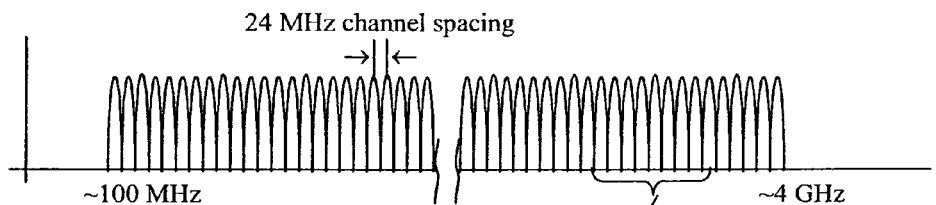
Figure 2C:
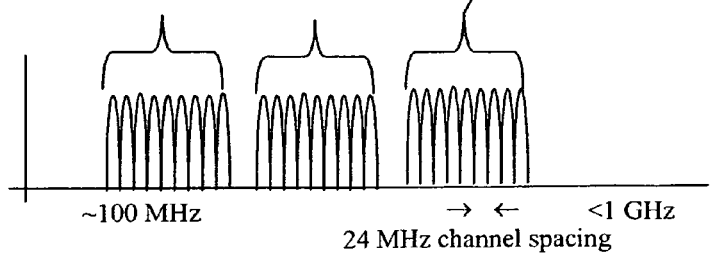

FIGS. 2b–c show RF spectra at various points in system 100. FIG. 2a illustrates the RF spectrum for conventional HFC plant 145 carrying digital information on QAM subcarriers spaced at 6 MHz. FIG. 2b illustrates the RF spectrum for FTTH plant 130 carrying digital information on QPSK subcarriers spaced at 24 MHz. This spectrum is received by ONU 172 and has a bandwidth that extends to frequencies much higher than the bandwidth of HFC plant 145. Additionally, the RF spectrum for FTTH plant 130 is for a single wavelength, and multiple wavelengths may be used to transmit information over FTTH plant 130.

FIG. 2c illustrates the RF spectrum for transmission between adaptors 170 and 175 over in-home wiring 185. As discussed above, it may be beneficial to select a particular channel or subset of the received QPSK channels received at ONU 172 when the connection (e.g., in-home wiring 185) between ONU 172 and CPE 190 has a limited bandwidth. Multiple channels or multiple bands of RF channels can be selected by adaptor 170, so that multiple televisions (or other CPE) requesting channels in different RF bands can be served.

Figure 3:
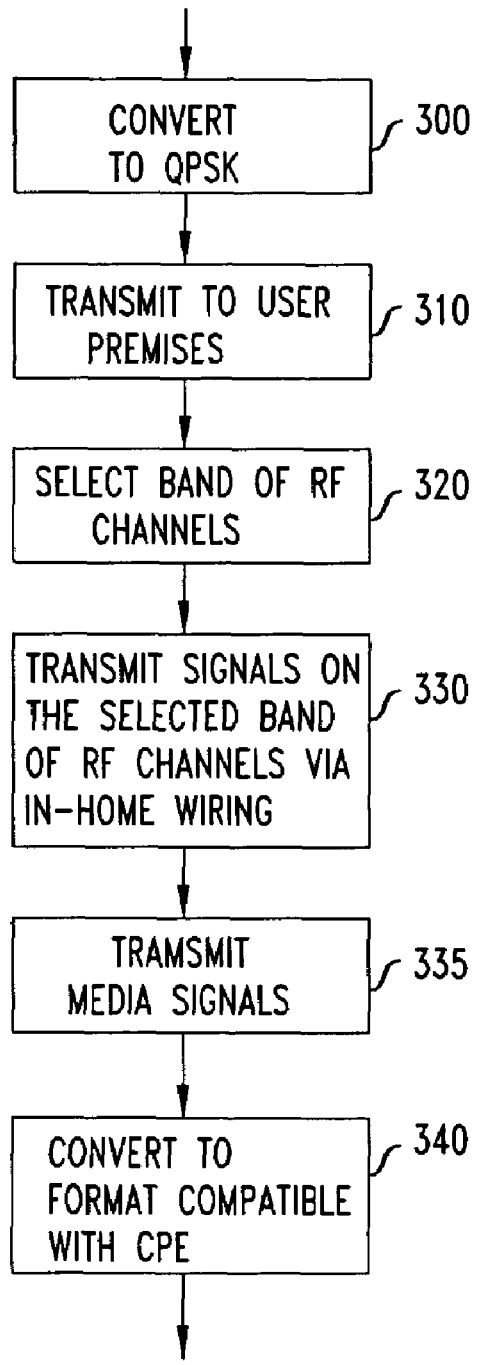
FIG. 3 is a flow-diagram outlining an exemplary process applicable to the preferred embodiment of the present invention shown in FIG. 1.

FIG. 3 illustrates a method employing the principles of the present invention. In step 300, information, such as media signals including one or more of video, audio or data, is converted to QPSK format in HE 110. In step 310, the information is transmitted to user premises 120 via FTTH plant 130. In step 320, adaptor 175 sends a channel selection signal to adaptor 170 indicating a desired RF channel carrying desired media signals (i.e., media signals a user desires to listen to and/or view). The channel selection signal may be adapted from a signal received from a user input device, such as remote control 177, controlled by a user to select the desired channel. In step 330, adaptor 170 sets a band selector to select an RF channel or band of RF channels that include the desired RF channel. In step 335, media signals carried by the band of RF channels are transmitted to adaptor 175 via in-home wiring 185. In step 340, the signals are converted to a format compatible with CPE 190.

In another preferred embodiment of the present invention, adaptor 170 and 175 are incorporated in ONU 172, so that only one RF channel, rather than a band of RF channels, is transmitted to each CPE 190.

In still another preferred embodiment of the present invention using wave division multiplexing (WDM), multiple wavelengths can be used to transmit information to users. Employing WDM increases the capacity of FTTH plant 130, because each wavelength can transmit multiple RF channels. For example, multiple RF channels may be subcarrier multiplexed on a single wavelength and multiple wavelengths may be multiplexed on a fiber-optic link. For this embodiment, adaptor 170 located at ONU 172 selects a desired wavelength and chooses the appropriate RF band to transmit information to CPE 190 via in-home wiring 185. Additionally, an optical band selector (not shown) may be used to allow one or more CPE 190 to choose channels carried by different wavelengths. This would be controlled in the same manner as the RF band selector in adaptor 170.

When RF channels transmitted via FTTH 130 to user premises 120 fall within the communication bandwidth of in-home wiring 185 (e.g., when the highest frequency channel is within is below approximately 1 GHz, and in-home wiring 185 is coaxial cable) the need for an RF band selector in ONU 172 may be avoided, because all the signals carried by the RF channels can be sent to CPE 190.

In another preferred embodiment of the present invention, FTTH plant 130 is replaced with a fiber-to-the-curb infrastructure. For this embodiment, ONU 182 is located outside the home and is connected to the in-home wiring 185 via a drop cable.

Additionally, adaptors employing the principles of adaptors 170 and 175 can be used for upstream transmission. Upstream bandwidth in an HFC plant is limited and often cannot provide a high SNR. Therefore, it is desirable to take advantage of the far greater bandwidth provided by a FTTH network. One of ordinary skill in the art would readily recognize that similar adaptors and transmission equipment can be used for upstream transmission in FTTH plant 130. Also, system 100 is not limited to converting digital video signals to QPSK format at HE 110. Other digital and/or analogue information, such as data, analogue video, digital/analogue audio and the like may be converted to QPSK format from other known formats for transmission over FTTH 130. Instead of QPSK, signals can also be converted to other formats, which are less spectrally efficient than 64-QAM, but do not require a high SNR. For example, RF subcarriers can be ON/OFF keyed to transmit channels from HE 110 to the user. Also, analogue amplitude modulated (AM) signals can be converted to a frequency modulated (FM) format.

What has been described are the preferred embodiments of the present invention. It will be apparent, however, to those skilled in the art that it is possible to embody the invention in specific forms other than those disclosed in the preferred embodiments described above. This may be done without departing from the spirit of the invention, and the preferred embodiments are merely illustrative and should not be considered restrictive in any way. The scope of the invention is given by the appended claims, rather than the preceding description.

What is claimed is:

1. An adaptor apparatus coupled to a user premises and operable to receive media signals transmitted over a distribution plant in a first format, the adaptor circuit comprising:

first adaptor circuitry coupled to customer premises equipment and operable to (1) receive signals indicative of a channel selection from a user input device, (2) receive on a channel associated with the channel selection, the media signals in the first format and (3) convert the signals to a second format compatible with the customer premises equipment; and second adaptor circuitry coupled to the first adaptor circuitry and operable to receive signals indicative of a channel selection from the first adaptor circuitry and send the media signals in the first format on the selected channel to the first adaptor circuitry;

wherein the first format is a QPSK modulation format and the second format is QAM modulation format.

* * * * *